United States Patent [19]

Mulford

[11] Patent Number: 5,768,683
[45] Date of Patent: Jun. 16, 1998

[54] METHOD FOR AUTOMATIC RE-TRANSMISSION OF VOICE MESSAGES BY A MOBILE COMMUNICATION UNIT

[75] Inventor: Keith L Mulford, Arlington Heights, Ill.

[73] Assignee: Motorola, Inc., Schaumburg, Ill.

[21] Appl. No.: 539,565

[22] Filed: Oct. 5, 1995

Related U.S. Application Data

[63] Continuation-in-part of Ser. No. 114,882, Sep. 1, 1993, abandoned.

[51] Int. Cl.$^6$ ............................................. H04B 7/15
[52] U.S. Cl. ........................... 455/11.1; 455/15; 370/315
[58] Field of Search ............................ 455/11.1, 9, 13.4, 455/15, 54.1, 68, 69, 89, 127; 370/315

[56] References Cited

U.S. PATENT DOCUMENTS

| | | | |
|---|---|---|---|
| 4,882,765 | 11/1989 | Maxwell et al. | 455/11 |
| 5,056,152 | 10/1991 | Truby et al. | 455/11 |
| 5,109,526 | 4/1992 | Reed | 455/15 |
| 5,163,158 | 11/1992 | Tendler et al. | 455/11.1 |

*Primary Examiner*—Edward F. Urban
*Attorney, Agent, or Firm*—Christopher P. Moreno

[57] ABSTRACT

A digital voice message, including a continuously embedded portable identification code, is transmitted by a portable communication unit (105) to a mobile communication unit (104) and to broadcast units (101–103). Based on the portable identification code, the mobile communication unit determines that it is associated with the portable communication unit. If, after a first predetermined period of time has elapsed, the mobile communication unit determines that the digital voice message is not being re-transmitted, in real time, by a broadcast unit (101), mobile repeater is enabled by the mobile communication unit and the digital voice message is re-transmitted as a mobile repeated message, thereby effectively extending the transmitting range of the portable communication unit.

13 Claims, 7 Drawing Sheets

METHOD FOR AUTOMATIC RE-TRANSMISSION OF VOICE MESSAGES BY A MOBILE COMMUNICATION UNIT

CROSS-REFERENCE TO RELATED APPLICATIONS

This is a continuation-in-part of prior application Ser. No. 08/114,882, filed Sep. 1, 1993, now abandoned, by Keith L. Mulford, the same inventive entity as in the present application, which prior application is assigned to Motorola, Inc., and which prior application is hereby incorporated by reference verbatim, with the same effect as though the prior application were fully and completely set forth herein.

FIELD OF THE INVENTION

The present invention relates generally to digital voice communication systems and, in particular, to method a for the automatic re-transmission of voice messages by a mobile communication unit.

BACKGROUND OF THE INVENTION

Communication systems are known to comprise broadcast units which transceive a limited number of communication resources, in-car mobile communication units, and in-hand portable communication units. The cost of an infrastructure (e.g. interconnected broadcast units, including fixed base stations or repeaters) for such communication systems varies if the system is intended to primarily support higher-power mobiles or lower-power portables. The transmit power of portables is typically limited to less than 5 watts, while mobile units range up to 110 watts. Thus, communication systems that support portables rather than mobiles require more complex and expensive infrastructures so that the portables can gain access to the system infrastructure. Systems that support mobiles rather than portables can have less complex infrastructures (i.e. fewer base stations/repeaters) since the higher transmit power of the mobiles allows them to more readily access the system infrastructure. In urban areas where a large number of portables may be used within a system, the higher expense of a more complex infrastructure can be justified. In systems covering larger geographic areas and utilizing a relatively small number of portables, such as state-wide police systems, the infrastructure cost required to provide adequate portable coverage quickly becomes too large to be justified. Often, users within such systems are forced to accept less than desirable solutions for their communication needs.

A further characteristic of digital voice communication systems is that voice messages cannot tolerate any significant delays. Typical land mobile radio voice messages are 4 to 45 seconds in duration in a push-to-talk (PTT) environment. Within a digital voice system, messages are typically sent by dividing the message into a series of frames of digital voice (typically 20 to 30 msec.) which must be transmitted in real time and recovered in real time. These frames must be decoded in sequence and presented to the user in the correct order to produce intelligible voice. Due to the real time nature of conversational speech, digital voice systems do not include provisions to detect and re-send missing pieces of information, or to acknowledge the correct receipt of a message segment. Furthermore, in order for a conversation to be effective between two people using digital voice radios, no significant delay in the delivery of the voice information is acceptable; delays approaching half a second or more have been found to be prohibitive. Thus it is generally not desirable to store an extended portion of speech, re-order out of sequence pieces, or request replacement pieces from the sender as is possible in data systems.

One solution to the problem of reducing infrastructure cost while providing large coverage areas is to create mobile-only voice systems. Obviously, this is an inadequate solution to those users requiring portable units. A second solution is to provide each user in a system with a mobile and a portable. Thus, when operating in areas of relatively dense infrastructure, such as an urban area, the user can utilize either the portable or mobile; when operating in areas of relatively sparse infrastructure, such as rural areas, only the mobile is used. This solution is inadequate, however, in that the user must constantly be aware of whether they are in or out of range of the portable's transmit power. Additionally, a mobile user in an area better suited to portable usage could mistakenly interfere with other portable users in that area due to the significantly higher mobile transmit power.

A third solution is to provide each user with both a mobile and a portable, but allow the mobile to act as a repeater for the portable when desired. Such mobile repeater configurations typically require the user to either activate a switch or remove the portable radio from a holder fixed in the vehicle to manually activate the repeater operation. Any messages subsequently transmitted by the portable are received by the mobile and re-transmitted at a higher power. If, however, the user must leave the vehicle in a hurry, as is often the case with public safety personnel, it is easy to forget to enable the mobile repeater, thus rendering the portable useless and possibly creating a significant safety hazard to the user due to the lack of communications. Additionally, failure to properly disable a mobile repeater creates unnecessary high-power mobile repeater transmissions which can "swamp" (or capture) base stations and/or repeaters with RF power and "drown out" other lower-power portable units trying to talk directly with the infrastructure.

It is also highly probable that multiple users, such as police officers, with mobile repeaters may converge on one physical location and place their repeaters into simultaneous use on the same radio frequencies creating destructive interference. Solutions to this problem are discussed in U.S. Pat. No. 5,056,152 entitled DUAL LEVEL PRIORITIZED VEHICULAR REPEATER SYSTEM issued Oct. 8, 1991 and in U.S. Pat. No. 5,109,526 entitled VEHICULAR REPEATER SYSTEM issued Apr. 28, 1992, both assigned to Motorola, Inc. These solutions are successful, but do not totally resolve the problems presented by mobile repeaters.

Therefore, a need exists for a method of automatic mobile repeater operation which avoids the need for additional infrastructure equipment. Such a method should not require a user of a portable to switch radios or manually activate a mobile repeater, and should avoid the activation of multiple repeaters in one area resulting in unnecessary mobile repeater operation.

DESCRIPTION OF A PREFERRED EMBODIMENT

Generally, the present invention provides a method for automatic mobile repeater operation in a digital voice communication system. This is accomplished by allowing a portable radio to gain access to a broadcast unit either by direct communications or through the automatic activation of higher-power mobile repeater operation by an associated mobile communication unit. The mobile determines, in real time, whether direct portable-to-infrastructure communications have been achieved or if mobile repeater operation is required to achieve communications between the portable and broadcast unit. If mobile repeater operation is required, digital voice signals transmitted by the portable are automatically repeated in real time by the mobile. With such a method, a portable user is able to access a communication system without the provision of additional infrastructure equipment and without requiring the user to switch communication units or manually enable and/or disable mobile repeaters.

Figure 1:
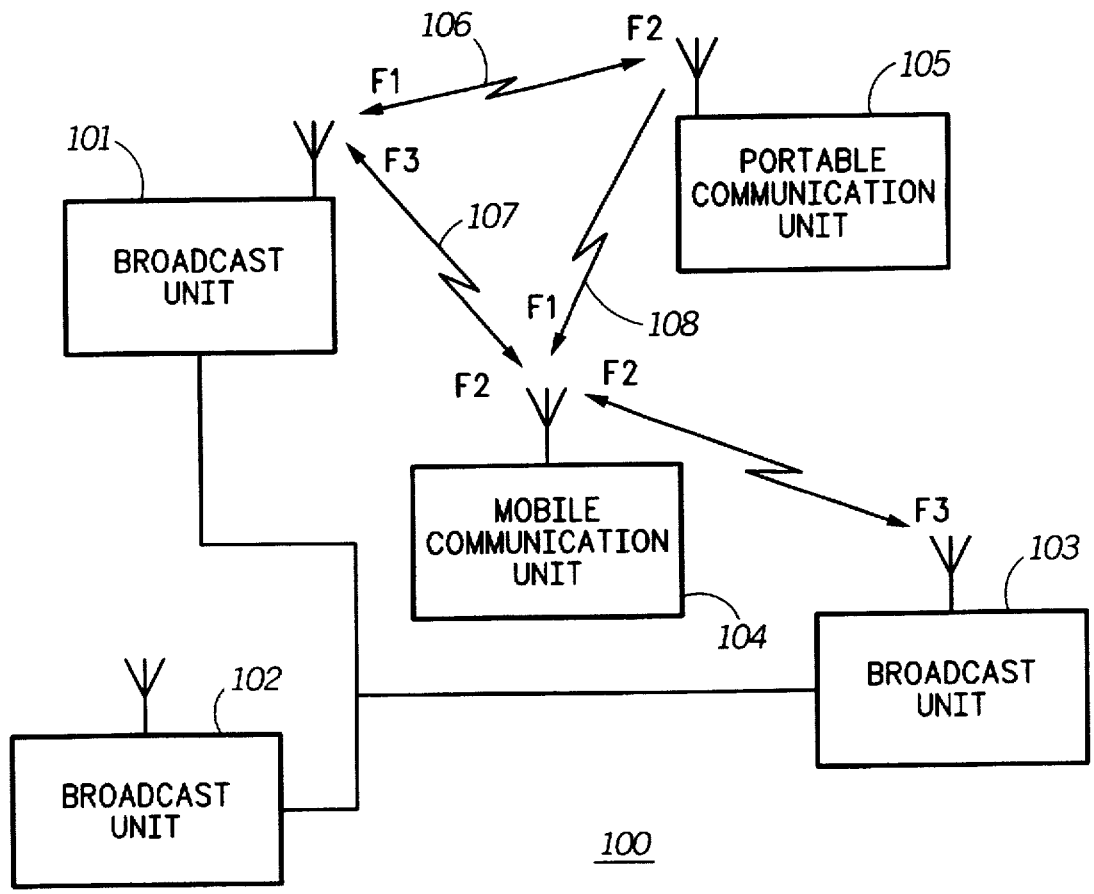
FIG. 1 is a block diagram of a digital voice communication system in accordance with the present invention.

The present invention can be more fully described with reference to FIGS. 1-10. FIG. 1 illustrates a communication system 100 that may be a trunking communication system, a conventional communication system, or a communication network. Regardless of the type of the system, the communication system 100 includes one or more broadcast units 101-103, one or more mobile communication units 104, one or more portable communication units 105, and communication resources 106-108. The mobile and portable communication units 104-105 may be ASTRO™ Digital SPECTRA® Mobile and ASTRO™ Digital SABER™ Portable radios, respectively, by Motorola, Inc. It is hereinafter assumed that the mobile unit 104 operates as an associated mobile communication unit to the portable 105 and that the portable 105 has a portable unique identification (ID) code which is known (as a stored portable ID code) to the associated mobile unit 104. The broadcast units 101-103 may be Motorola ASTRO™ Digital QUANTAR™ repeater stations which transceive the communication resources 106-108, where the communication resources 106-108 may be multiple RF (radio frequency) channels, time division multiplex (TDMA) slots, or any other RF transmission mediums.

For the purposes of illustration, it is hereinafter assumed that the portable 105 transmits at a frequency F1, that the broadcast units 101-103 transmit at a frequency F2, and that the mobile unit 104 transmits at a frequency F3, as shown in FIG. 1. It is further assumed that the mobile 104 is capable of receiving signals transmitted at frequencies F1 and F2, a first broadcast unit 101 at frequencies F1 and F3, a second broadcast unit 103 at frequency F3 only, and the portable 105 at frequency F2.

When the portable 105 transmits a digital voice message, its portable ID code is continuously embedded in the voice message for the duration of the voice message. The process of embedding a continuous ID code in a digital voice message is known and defined in various standards such as the Association of Public Safety Communication Officers (APCO) Project-25 standard for public safety radio systems.

When the portable 105 is operating within close proximity of the broadcast units 101-103, it transmits (on frequency F1) directly to at least one of the broadcast units. The digital voice message, including the continuously embedded portable ID code, is received by the broadcast unit 101 and repeated back out to other communication units (not shown), as well as the mobile 104 and portable 105, on frequency F2.

When the portable 105 travels beyond its transmit range relative to the receiver portion of the broadcast unit 101, transmitted messages from the portable 105 will not be received by the broadcast unit 101. Therefore, the message will not be repeated by the broadcast unit 101 and communications will fail in the absence of mobile repeater capability.

The mobile 104 associated with the portable 105 is equipped with mobile repeater capability. The mobile 104 monitors the activity on both the portable inbound frequency F1 and the broadcast unit outbound frequency F2. As will be described in greater detail below, the mobile 104 determines, based on embedded ID information received from the portable 104 and from the broadcast unit 101, when to enable the mobile repeater.

Figure 2:
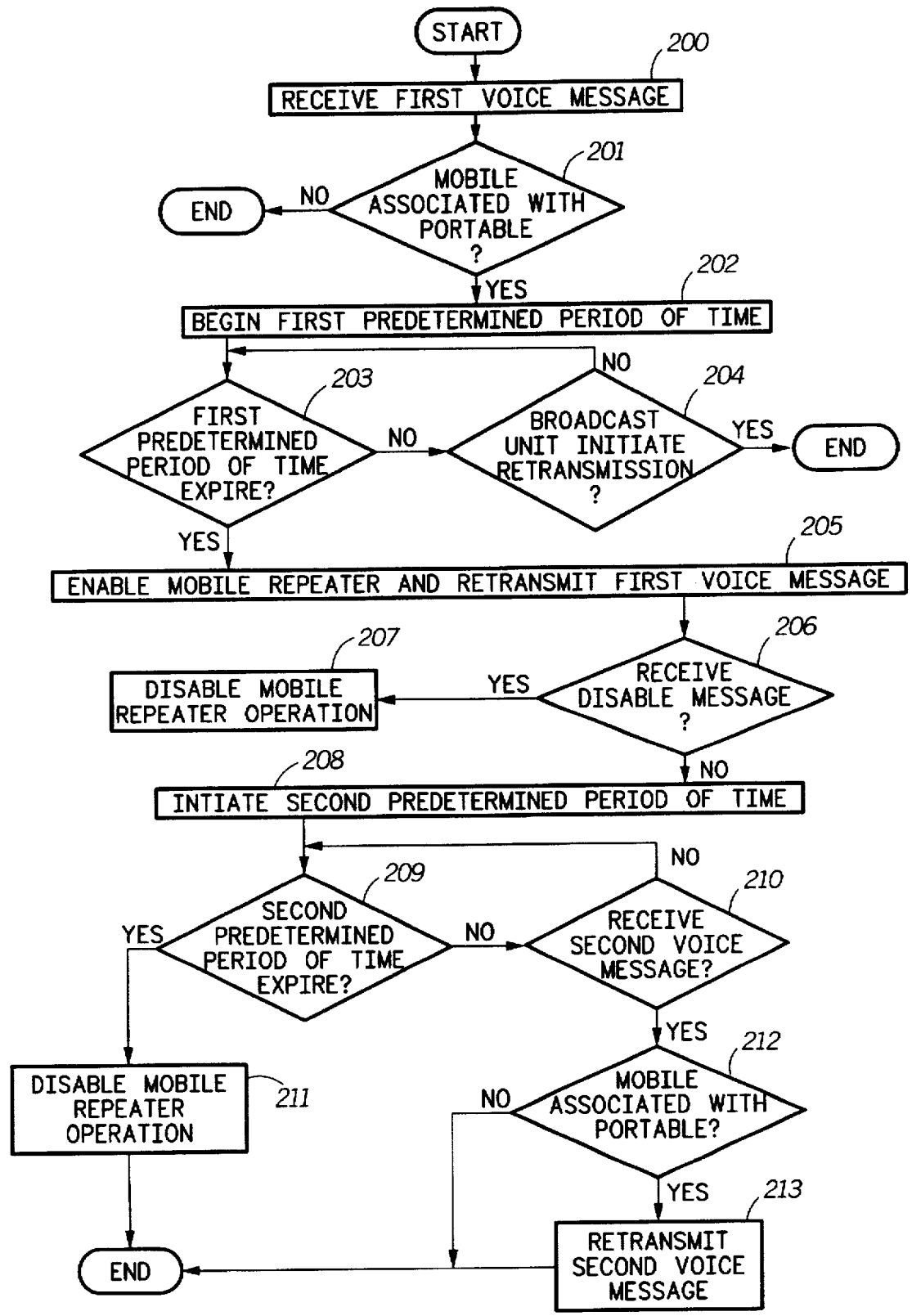
FIGS. 2-4 are flowcharts of multiple embodiments of operation for a mobile communication unit.

FIG. 2 is a flowchart of a first embodiment of operation of a mobile communication unit. The methods shown in FIGS. 2-4 can be stored in digital memory as software routines that are later executed by a processor, such as a microcontroller or digital signal processor. In a preferred embodiment, a suitable digital memory and processor are included in all mobile communication units. At step 200, the mobile receives a first voice message from a portable communication unit. The portable ID code for the portable is continuously embedded in the first voice message.

At step 201, the mobile determines if it is associated with the portable that is transmitting the first voice message. This is accomplished by comparing the portable ID code included in the first voice message against the stored portable ID code included in the mobile, e.g., stored in digital memory. If the portable ID code and the stored portable ID are not substantially identical, then the mobile is not associated with the portable and the process ends.

If, however, the ID codes match, the mobile recognizes the presence of an inbound message from its associated portable unit. At this point, the mobile can check for a special condition indicator. (Treatment of the special condition indicator is discussed later with reference to FIG. 4.) Assuming that a special condition indicator is not present, the mobile begins, at step 202, a first predetermined period of time. The first predetermined period of time can be measured using a software-based timer routine. The first predetermined period of time allows broadcast units time to receive and begin repeating the first voice message. In a preferred embodiment, the first predetermined period of time is typically in the range of 50-100 ms., but may be extended based on the complexity of the infrastructure system.

At step 203, it is determined if the first predetermined period of time expired. If not, it is determined, at step 204, if a broadcast unit has initiated a re-transmission of the first voice message. To this end, the mobile has to receive a first re-transmitted message from a broadcast unit, e.g., on frequency F2. The first re-transmitted message includes a continuously embedded first re-transmitted ID code. The mobile compares the first re-transmitted ID code with the portable ID code embedded in the first voice message (still being received by the mobile). If the first re-transmitted ID code and the portable ID code are substantially identical, then the mobile knows that the portable is within range of the fixed repeater and therefore does not activate its repeat operation. Steps 203 and 204 are repeated for the duration of the first predetermined period of time.

If, at step 203, it is determined that the first predetermined period of time has expired, and therefore that a broadcast unit has not initiated a re-transmission of the first voice message, it is assumed that the portable which is still transmitting the first voice message is out of range of a broadcast unit. Thus, at step 205, the mobile automatically, and immediately, enables mobile repeater operation and re-transmits the first voice message (e.g., on frequency F3) to produce a first mobile repeated message. A mobile ID code associated with the mobile, as well as the portable ID code included in the first voice message, are continuously embedded in the first mobile repeated message. The first mobile repeated message will terminate when the first voice message terminates.

If at any point during mobile repeater operation a mobile repeater disable message, uniquely addressed to the mobile unit, is received (step 206), mobile repeater operation is immediately disabled at step 207. Methods for uniquely addressing messages for individual communication units are well known in the art.

At the end of the first voice message (and, consequently, the first mobile repeated message), the mobile initiates a second predetermined period of time at step 208. In a preferred embodiment, the second predetermined period of time is at least one minute to allow for the possibility that the portable that transmitted the first voice message will follow up with a second voice message in a relatively short period of time.

At steps 209 and 210, it is determined if a second voice message is received from a portable unit (e.g., via frequency F1) before expiration of the second predetermined period of time. If not, mobile repeater operation is disabled at step 211. However, if the second voice message is received before the expiration of the second predetermined period of time, it is again determined, at step 212, if the mobile is associated with the portable which transmitted the second voice message. Step 212 is procedurally equivalent to step 201.

If the mobile is associated with the portable transmitting the second voice message, the second voice message is re-transmitted, at step 213, to produce a second mobile repeated message. As before, the mobile ID code and the portable ID code included in the second voice message are continuously embedded in the second mobile repeated message. Steps 208 through 213 allow the mobile to immediately proceed with mobile repeater operation (without having to determine if the portable is in range of a broadcast unit as in step 204) in those instances in which it is less likely that the portable has come in range of a broadcast unit since its last transmission.

Figure 3:
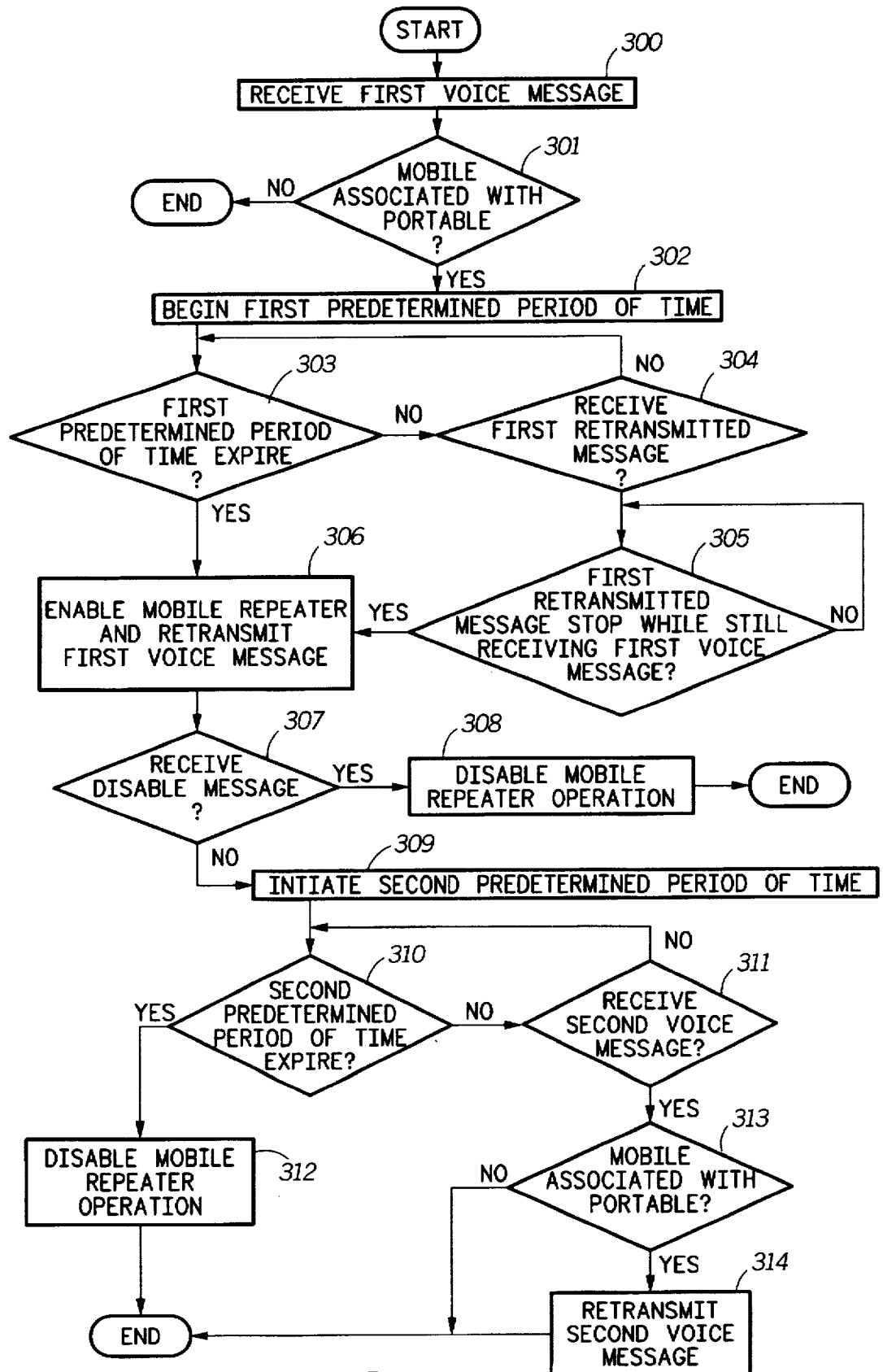

FIG. 3 is a flowchart of a second embodiment of operation of a mobile communication unit. The steps illustrated in FIG. 3 are essentially equivalent to those illustrated in FIG. 2 with the exception that step 204 is replaced with steps 304 and 305. At step 304, it is determined if a first re-transmitted message that includes a first re-transmitted identification code comprising the same portable ID code as that included with the first voice message (per step 300 and analogous step 200) is received prior to expiration of the first predetermined period of time (per steps 302–303 and analogous steps 202–203). If so, operation continues through steps 306–314 (analogous to steps 205–213).

If, however, a first re-transmitted message that includes the portable ID code is received (indicating that the portable is within range of a broadcast unit), processing continues at step 305. At step 305, it is continuously determined if the first re-transmitted message is no longer being received even though the first voice message is still being received. If such a condition does not arise (i.e., they are both simultaneously received), it is assumed that the portable is within range of a broadcast unit for the duration of the first voice message.

If the condition described in step 305 does arise, it is assumed that the portable has, during the transmission of the first voice message, moved out of range of the broadcast unit which sourced the first re-transmitted message. In this case, mobile repeater operation is enable and the first voice message re-transmitted as the first mobile repeated message at step 306. In this manner, mobile repeater operation is able to adapt to changing conditions (i.e., portable moves out of range during a message) and thereby provide continuity to messages transmitted by an associated portable.

Figure 4:
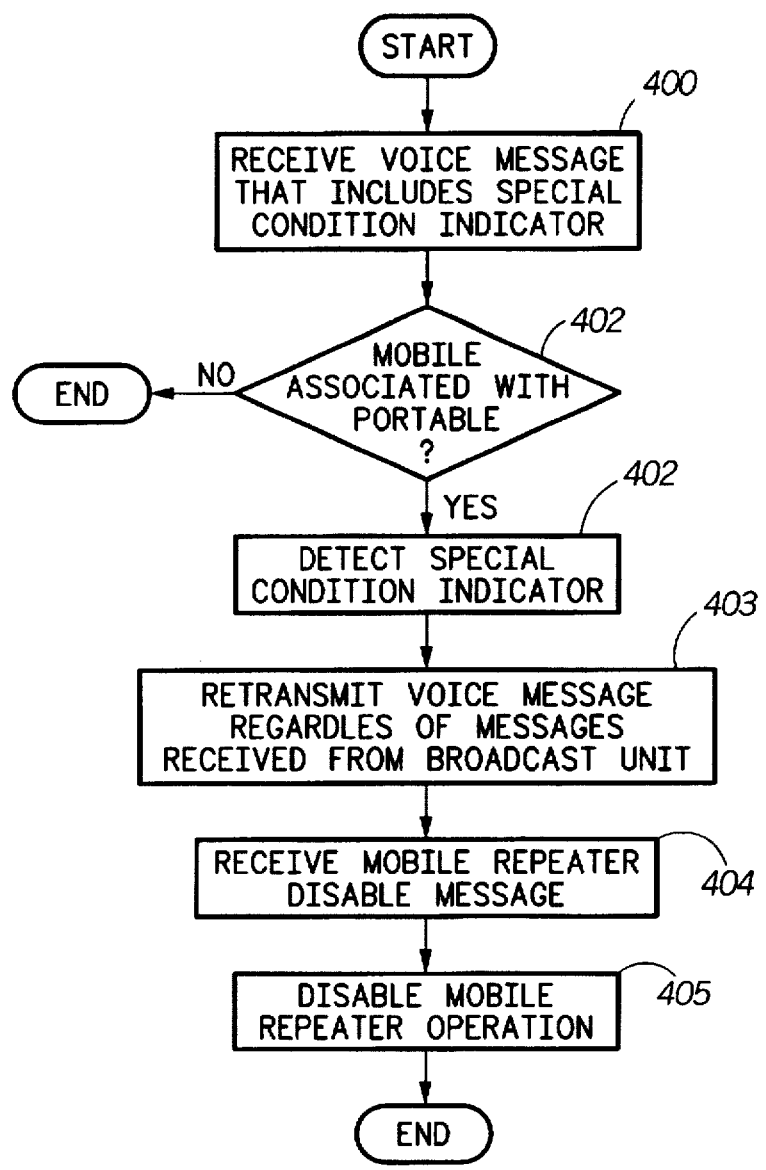

FIG. 4 is a flowchart of a third embodiment of operation of a mobile communication unit. In particular, FIG. 4 illustrates operation of a mobile in the presence of a special message indicator. At step 400, the mobile receives a voice message in which a portable ID code and a special condition indicator are continuously embedded. At step 401 (as in steps 201 and 301 above), it is determined whether the mobile is associated with the portable currently transmitting the voice message.

When the mobile is associated with the portable, the special condition indicator is detected in the voice message at step 402. In a preferred embodiment, the special condition indicator is used to indicate the occurrence of an emergency situation, as would typically be required in public safety systems, e.g., police and fire departments. It is understood that a special condition indicator could be used to specify any of a number of circumstances as required by a particular system.

At step 403, upon detecting the special condition indicator, the mobile immediately enables mobile repeater operation and re-transmits the voice message as a mobile repeated message, regardless of any message activity currently being received by the mobile from any broadcast unit. In addition to the portable ID code and the mobile ID code, the special condition indicator is continuously embedded in the mobile repeated message. In this manner, the mobile repeater operation is used to assure that the special condition message gets through to a broadcast unit, either directly from the portable (if within range) or indirectly from the mobile, without delay. Any broadcast unit that detects a special condition message, either directly from a portable or indirectly from a mobile, gives repeat priority over all other messages, including those currently occupying the repeat path.

After voice message (and, consequently, the mobile repeated message that includes the special condition indicator) has concluded, the mobile receives, at step 404, a uniquely addressed mobile repeater disable message from the broadcast unit. Subsequently, at step 405, mobile repeater operation is disabled in the mobile so as to prevent unnecessary mobile repeater operation. Of course, mobile repeater operation may subsequently be re-enabled according to the methods described in FIGS. 2 and 3, for example.

Figure 7:
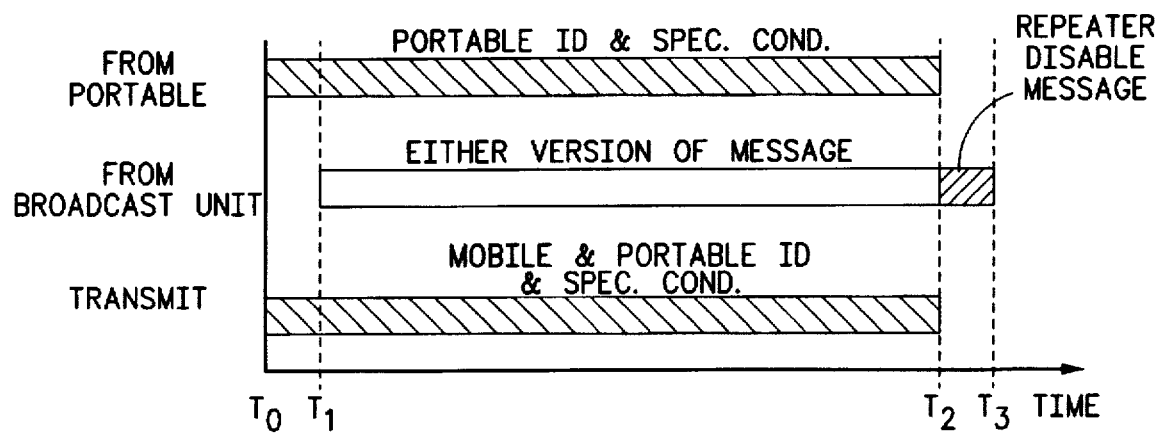
FIG. 7 illustrates an operational example of a mobile communication unit.

FIG. 7 illustrates an operational example of the embodiment described with regard to FIG. 4 from the point of view of a mobile communication unit. In particular, the mobile immediately re-transmits the voice message that includes the special condition indicator (coming from the portable) rather than first waiting for a first predetermined period of time (the interval from $T_0$ to $T_1$) to expire. Furthermore, as shown, the mobile repeater disable message, uniquely addressed to the mobile, is transmitted by the broadcast unit immediately after the conclusion of the voice message (the interval from $T_2$ to $T_3$).

Figure 5:
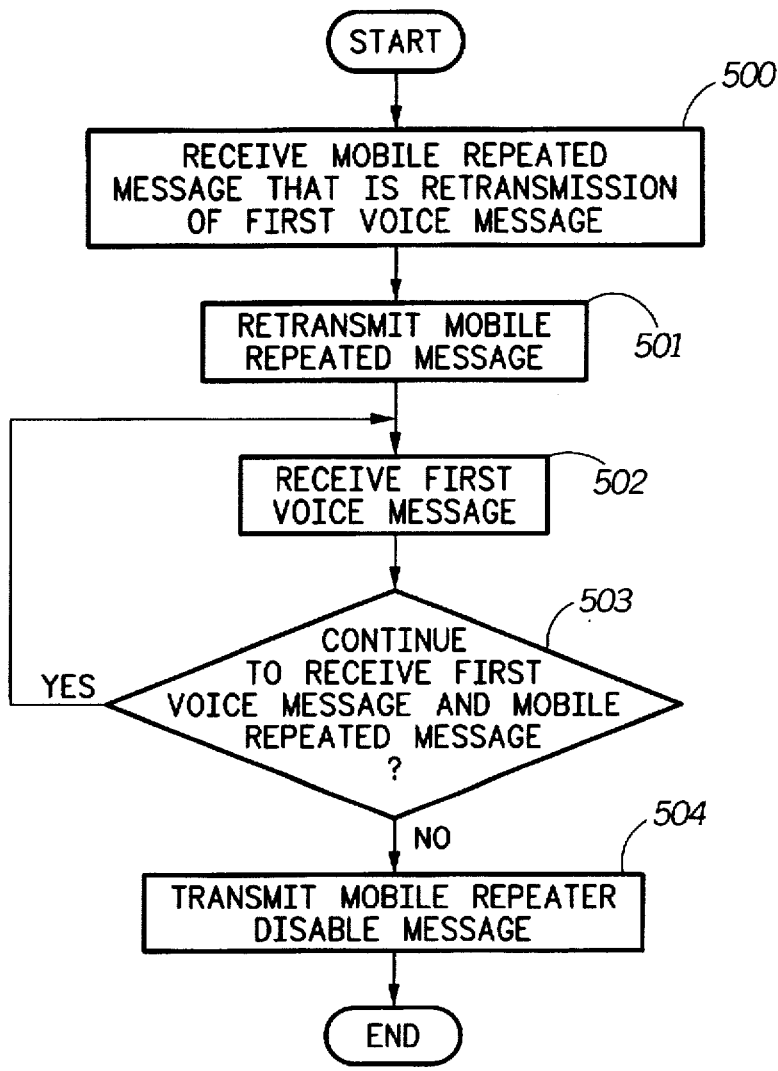
FIGS. 5 and 6 are flowcharts of multiple embodiments of operation for a broadcast unit.

The present invention also requires compatible operation by broadcast units when mobile repeater operation is enabled at a mobile communication unit. FIG. 5 is a flowchart of a first embodiment of operation of a broadcast unit. The methods shown in FIGS. 5 and 6 can be implemented as stored software routines in digital memory that are later executed by a processor, which digital memory and processor are included in all broadcast units.

At step 500, a broadcast unit receives a mobile repeated message that includes continuously embedded portable and mobile ID codes. In accordance with mobile repeater operation described above, the mobile repeated message is a re-transmission, by a mobile, of a first voice message sourced by a portable. This condition indicates that the portable was out of range of the broadcast unit when the first voice message was initiated.

At step 501, the mobile repeated message is re-transmitted to produce a first re-transmitted message that includes a continuously embedded first re-transmitted ID code. The first re-transmitted ID code comprises the portable and mobile ID codes included in the mobile repeated messages.

At step 502, while still receiving the mobile repeated message, the first voice message is received by the broadcast unit. Such an occurrence indicates that the portable sourcing the first voice message has moved in range, during transmission, of the broadcast unit. In a preferred embodiment, the mobile repeated message is not replaced by the first voice message until the current transmission is complete, even if the first voice message would normally have priority over the mobile repeated message. In this manner, the continuity of the first re-transmitted message is maintained. This is important because the mobile repeated message could be delayed relative to the first voice message and switching between two could create discontinuity the first re-transmitted message.

Operation continues as described above until it is determined, at step 503, that the first voice message and the mobile repeated message are no longer being received by the broadcast unit, indicating termination of the first voice message. Immediately after detection of this condition, a mobile repeater disable message, uniquely addressed to the mobile that sourced the mobile repeated message, is sent by the broadcast unit at step 504. This is done because it is assumed that the portable which moved in range of the broadcast unit at step 502 will continue to do so. If the portable does indeed stay in range, unnecessary mobile repeated messages will not be received. If the portable again moves out of range prior to its next voice message, mobile repeater operation can be initiated as described in FIG. 2.

Figure 8:
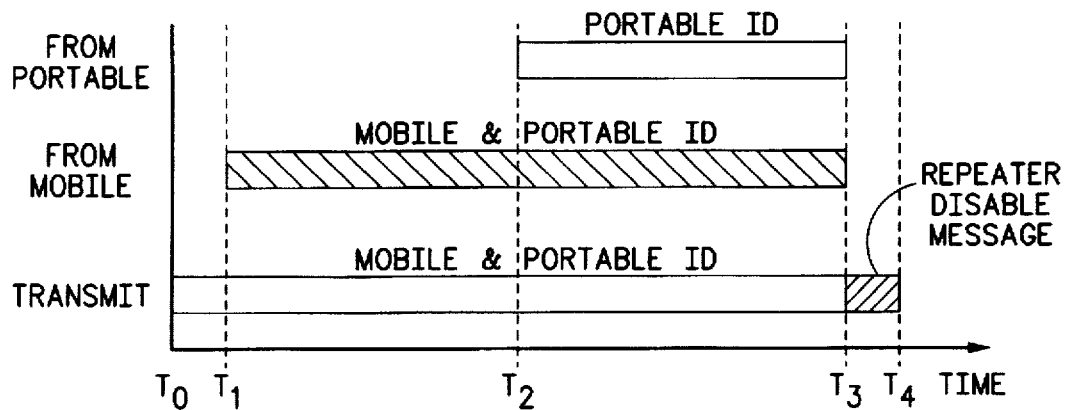
FIGS. 8 and 9 illustrate operational examples of a broadcast unit.

FIG. 8 illustrates an operational example of the embodiment described with regard to FIG. 5 from the point of view of a broadcast unit. In particular, despite the portable returning in range of the broadcast unit (at time $T_2$), the broadcast unit continues to re-transmit the mobile repeated message. Additionally, as shown, the mobile repeater disable message, uniquely addressed to the mobile, is transmitted by the broadcast unit immediately after the conclusion of the mobile repeated message (the interval from $T_3$ to $T_4$).

Figure 6:
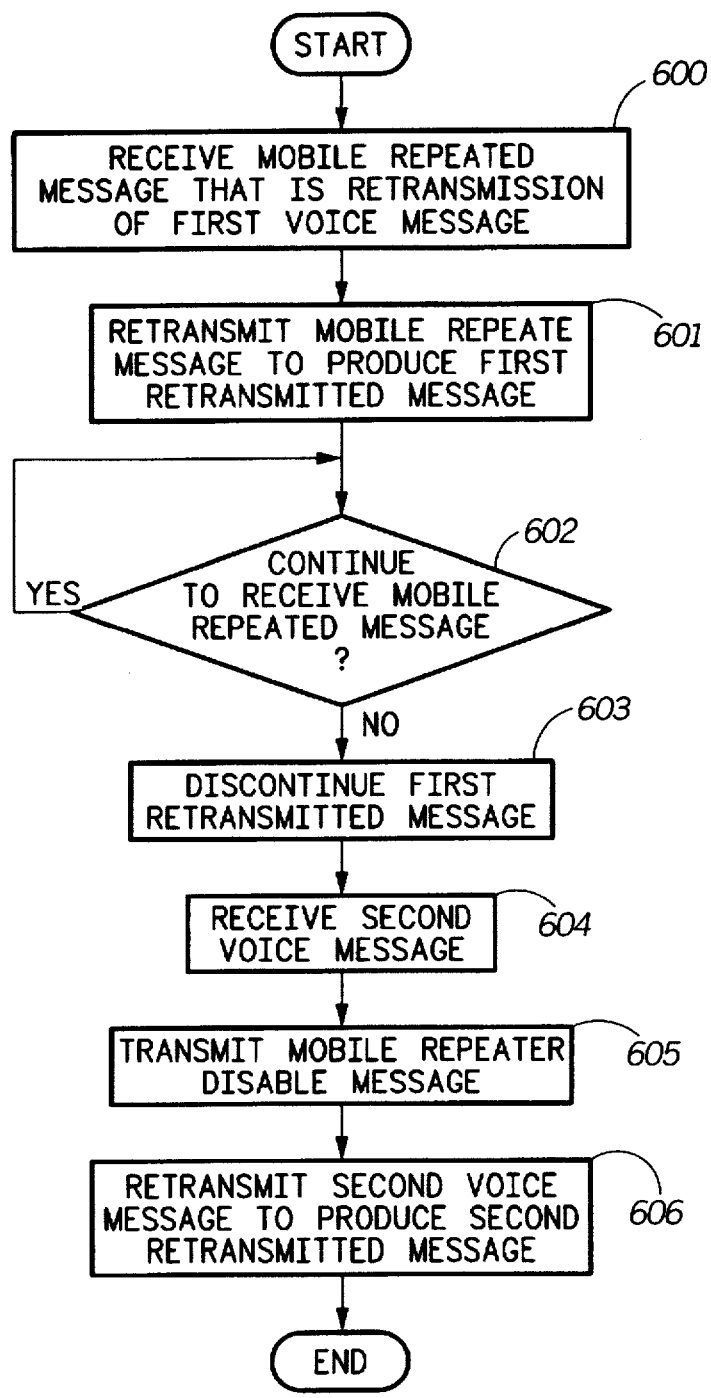

FIG. 6 is a flowchart of a second embodiment of operation of a broadcast unit. At step 600, a broadcast unit receives a mobile repeated message that includes continuously embedded portable and mobile ID codes. In accordance with mobile repeater operation described above, the mobile repeated message is a re-transmission, by a mobile, of a first voice message sourced by a portable, indicating that the portable was out of range of the broadcast unit when the first voice message was initiated.

At step 601, the mobile repeated message is re-transmitted to produce a first re-transmitted message that includes a continuously embedded first re-transmitted ID code. The first re-transmitted ID code comprises the portable and mobile ID codes included in the mobile repeated messages.

At step 602, it is continuously determined whether the mobile repeated message is still being received by the broadcast unit. If not, the first re-transmitted message is discontinued as step 603.

Some indeterminate amount of time after step 603, a second voice message, that includes the same continuously embedded portable ID code as received in the mobile repeated message, is received. Such a condition indicates that in between the first and second voice messages, the portable has returned in range of the broadcast unit. As such, the broadcast unit, at step 605, transmits a mobile repeater disable message, uniquely addressed to the mobile that sourced the mobile repeated message. The mobile repeater disable message will cause the mobile to discontinue mobile repeater operation, thereby preventing unnecessary mobile transmissions. Immediately after transmitting the mobile repeater disable message, at step 606, the broadcast unit initiates a re-transmission of the second voice message as a second re-transmitted message that includes a continuously embedded second re-transmitted ID code, the second re-transmitted ID code comprising the portable ID codes included in the second voice message.

Figure 9:
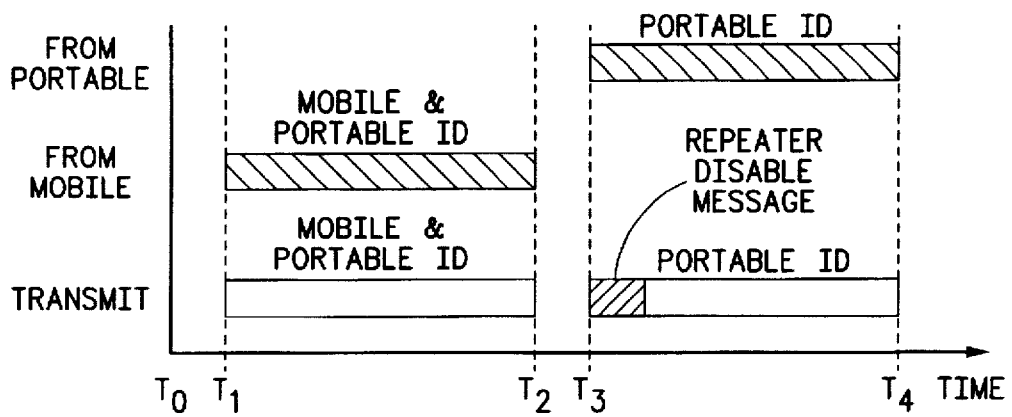

FIG. 9 illustrates an operational example of the embodiment described with regard to FIG. 6 from the point of view of a broadcast unit. In particular, mobile repeater operation for the first voice message proceeds as previously described in the interval from $T_1$ to $T_2$. When the second voice message (from the portable that is now within range of the broadcast unit) begins at time $T_3$, the mobile repeater disable message, uniquely addressed to the mobile, is transmitted by the broadcast unit immediately prior to re-transmission of the second voice message.

Understanding the present invention may be enhanced through the use of an example. In the case of a police officer in pursuit of a suspect, the ability to remain in contact with the dispatch center and other officers in the field is critical to the performance of the officer's job and personal safety. The officer may have direct communications with a broadcast unit using her portable radio while in a squad car or on the street. However, when the officer leaves the squad car and pursues the suspect into a basement or other area without direct communications to broadcast units, she would be effectively cut off from communications with the rest of the system. Using the present invention, the associated mobile within the officer's vehicle detects the failure of the portable to establish communications and automatically provides the needed relay of the officer's messages to the broadcast units. As a result, the officer is not placed in jeopardy because she forgot to enable mobile repeat operation before leaving the vehicle.

As additional officers arrive at the scene to aid the first officer, they may utilize their mobile repeaters on the same frequencies as the mobile repeater of the first officer. Since the mobile repeaters detect and repeat only messages from their associated portables, and do so only when the portables are out of range, multiple mobile repeaters will not be on the air at one time and the potential destructive interference caused by multiple simultaneously transmitting mobile repeaters is eliminated.

As the officer returns from the basement or back into direct coverage, his/her portable will regain direct access to the infrastructure. Detecting the portable's continuously embedded ID code during subsequent portable transmitted messages, the broadcast unit(s) sends a uniquely addressed mobile repeater disable message to the officer's associated mobile to disable the repeater operation. Alternately, the mobile may subsequently receive a message which includes it's associated portable unique identification code, but not its own unique identification code. The mobile can thus determine that the direct path has been recovered and mobile repeat is no longer need, disabling its repeat mode of operation.

If the officer discontinues transmitting before coming back within range of the broadcast units, the mobile will not know of the change in conditions. If, after a second predetermined time interval the mobile has not repeated a message from it's associated portable, the mobile repeater is disabled thereby preventing unnecessary use of the higher-power repeat operation.

The present invention provides a method for automatically extending the transmitting range of a portable communication unit. With such a method, limitations associated with the use of current mobile repeater operations to extend transmitting range are eliminated. The present invention allows mobiles associated with portables to automatically enable mobile repeater operation, thus freeing the user from adjusting either the mobile or portable, thereby reducing the potential for user errors which could disrupt communications.

Furthermore, an advantage of the present invention is that mobile repeater operation is capable of working in communication systems that are comprised exclusively of sites (i.e., coverage areas established by broadcast units) that are capable of mobile and portable access (e.g., the first broadcast unit 101) or that are restricted to mobile-only access (e.g., the second broadcast unit 103) or a hybrid mixture of both types of sites. In comparison, prior art mobile repeater systems were capable only of working within sites that were restricted to mobile-only access. In this manner, the present invention allows for more flexible system designs which can be better tailored to meet the needs of system users in the most efficient and economic manner.

I claim:

1. In a digital voice communication system, a method for a mobile communication unit to automatically re-transmit a first voice message received from a portable communication unit, the method comprising steps of:
   a) receiving, from the portable communication unit, the first voice message, wherein a portable identification code for the portable communication unit is continuously embedded in the first voice message;
   b) determining that the mobile communication unit is associated with the portable communication unit when the portable identification code is substantially identical to a stored portable identification code stored in the mobile communication unit;
   c) initiating a first predetermined period of time when the portable identification code and the stored portable identification code are substantially identical;
   d) determining whether a broadcast unit has initiated a re-transmission of the first voice message prior to expiration of the first predetermined period of time; and
   e) enabling mobile repeater operation and re-transmitting the first voice message to produce a first mobile repeated message when it is determined that the broadcast unit has not initiated the re-transmission of the first voice message prior to expiration of the first predetermined period of time, wherein the portable identification code and a mobile identification code for the mobile communication unit are continuously embedded in the first mobile repeated message.

2. The method of claim 1, step (d) further comprising steps of:
   prior to expiration of the first predetermined period of time:
   d1) receiving concurrently a first re-transmitted message from the broadcast unit, wherein a first re-transmitted identification code is continuously embedded the first re-transmitted message;
   d2) comparing the first re-transmitted identification code with the portable identification code; and
   d3) when the first re-transmitted identification code and the portable identification code are substantially identical, determining, by the mobile communication unit, that the broadcast unit has initiated a re-transmission of the first voice message prior to expiration of the first predetermined period of time.

3. The method of claim 1, further comprising steps of:
   f) receiving a mobile repeater disable message from the broadcast unit, wherein the mobile repeater disable message is uniquely addressed to the mobile communication unit; and
   g) disabling mobile repeater operation.

4. The method of claim 1, further comprising steps of:
   f) initiating a second predetermined period of time when the first mobile repeated message has discontinued;
   g) receiving, from the portable communication unit prior to expiration of the second predetermined period of time, a second voice message, wherein the portable identification code is continuously embedded in the second voice message;
   h) determining that the mobile communication unit is associated with the portable communication unit when the portable identification code is substantially identical to the stored portable identification code; and
   i) re-transmitting the second voice message to produce a second mobile repeated message when it is determined that the mobile communication unit is associated with the portable communication unit, wherein the portable identification code and the mobile identification code are continuously embedded in the second mobile repeated message.

5. The method of claim 4, further comprising a step of resetting mobile repeater operation when the second voice message is not received prior to expiration of the second predetermined period of time.

6. In a digital voice communication system, a method for a mobile communication unit to automatically re-transmit a first voice message received from a portable communication unit, the method comprising steps of:
   a) receiving, from the portable communication unit, the first voice message, wherein a portable identification code for the portable communication unit is continuously embedded in the first voice message;
   b) determining that the mobile communication unit is associated with the portable communication unit when the portable identification code is substantially identical to a stored portable identification code stored in the mobile communication unit;
   c) initiating a first predetermined period of time when the portable identification code and the stored portable identification code are substantially identical;

d) receiving a first re-transmitted message from a broadcast unit prior to expiration of the first predetermined period of time, wherein the portable identification code is continuously embedded in the first re-transmitted message and e) enabling mobile repeater operation and re-transmitting the first voice message to produce a first mobile repeated message when it is determined that the first re-transmitted message is no longer being received while the first voice message is being received, wherein the portable identification code and a mobile identification code for the mobile communication unit are continuously embedded in the first mobile repeated message.

7. The method of claim 6, step (d) further comprising steps of:

prior to expiration of the first predetermined period of time:

e1) comparing a first re-transmitted identification code with the portable identification code, wherein the first re-transmitted identification code is continuously embedded in the first re-transmitted message; and e2) when the first re-transmitted identification code and the portable identification code are substantially identical, determining, by the mobile communication unit, that the broadcast unit has initiated a re-transmission of the first voice message prior to expiration of the first predetermined period of time.

8. The method of claim 6, further comprising steps of:

f) initiating a second predetermined period of time when the first mobile repeated message has discontinued;

g) receiving, from the portable communication unit prior to expiration of the second predetermined period of time, a second voice message, wherein the portable identification code is continuously embedded in the second voice message;

h) determining that the mobile communication unit is associated with the portable communication unit when the portable identification code is substantially identical to the stored portable identification code; and i) re-transmitting the second voice message to produce a second mobile repeated message when it is determined that the mobile communication unit is associated with the portable communication unit, wherein the portable identification code and the mobile identification code are continuously embedded in the second mobile repeated message.

9. The method of claim 8, further comprising a step of disabling mobile repeater operation when the second voice message is not received prior to expiration of the second predetermined period of time.

10. In a digital voice communication system, a method for a broadcast unit to automatically re-transmit a first voice message initiated by a portable communication unit, the method comprising steps of:

a) receiving, from a mobile communication unit, a mobile repeated message, wherein the mobile repeated message is a re-transmission of the first voice message and wherein a portable identification code for the portable communication unit and a mobile identification code for the mobile communication unit are continuously embedded in the mobile repeated message;

b) initiating re-transmission of the mobile repeated message to produce a first re-transmitted message, wherein a first re-transmitted identification code is continuously embedded in the first re-transmitted message and wherein the first re-transmitted identification code comprises the portable identification code and the mobile identification code;

c) receiving, from the portable communication unit while receiving the mobile repeated message, the first voice message, wherein the portable identification code is continuously embedded in the first voice message; and d) transmitting a mobile repeater disable message uniquely addressed to the mobile communication unit when it is determined that the first voice message and the mobile repeated message are no longer being received from the portable communication unit and the mobile communication unit, respectively.

11. In a digital voice communication system, a method for a broadcast unit to automatically re-transmit a first voice message and a second voice message initiated by a portable communication unit, the method comprising steps of:

a) receiving, from a mobile communication unit, a mobile repeated message, wherein the mobile repeated message is a re-transmission of the first voice message and wherein a portable identification code for the portable communication unit and a mobile identification code for the mobile communication unit are continuously embedded in the mobile repeated message;

b) initiating re-transmission of the mobile repeated message to produce a first re-transmitted message, wherein a first re-transmitted identification code is continuously embedded in the first re-transmitted message and wherein the first re-transmitted identification code comprises the portable identification code and the mobile identification code;

c) discontinuing the first re-transmitted message when it is determined that the mobile repeated message is no longer being received from the mobile communication unit;

d) receiving, from the portable communication unit, a second voice message, wherein the portable identification code is continuously embedded in the second voice message;

e) transmitting a mobile repeater disable message uniquely addressed to the mobile communication unit; and f) initiating re-transmission of the second voice message to produce a second re-transmitted message, wherein a second re-transmitted identification code is continuously embedded in the second re-transmitted message and wherein the second re-transmitted identification code comprises the portable identification code.

12. In a digital voice communication system, a method for a mobile communication unit to automatically re-transmit a voice message received from a portable communication unit, the method comprising steps of:

a) receiving, from the portable communication unit, the voice message, wherein a portable identification code for the portable communication unit and a special condition indicator are continuously embedded in the voice message;

b) determining that the mobile communication unit is associated with the portable communication unit when the portable identification code is substantially identical to a stored portable identification code stored in the mobile communication unit;

c) detecting the special condition indicator when it is determined that the mobile communication unit is associated with the portable communication unit; and d) enabling mobile repeater operation, regardless of any messages received from a broadcast unit, and re-transmitting the voice message to produce a mobile repeated message when the special condition indicator is detected, wherein the portable identification code, a mobile identification code for the mobile communication unit and the special condition indicator are continuously embedded in the mobile repeated message.

13. The method of claim 12, further comprising steps of:

e) receiving a mobile repeater disable message from a broadcast unit, wherein the mobile repeater disable message is uniquely addressed to the mobile communication unit; and f) disabling mobile repeater operation.

* * * * *